(12) United States Patent
Chupeau et al.

(10) Patent No.: US 12,389,034 B2
(45) Date of Patent: Aug. 12, 2025

(54) METHOD AND APPARATUS FOR SIGNALING DEPTH OF MULTI-PLANE IMAGES-BASED VOLUMETRIC VIDEO

(71) Applicant: InterDigital CE Patent Holdings, SAS, Paris (FR)

(72) Inventors: Bertrand Chupeau, Rennes (FR); Franck Thudor, Rennes (FR); Renaud Dore, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/029,593

(22) PCT Filed: Sep. 29, 2021

(86) PCT No.: PCT/EP2021/076755
§ 371 (c)(1),
(2) Date: Mar. 30, 2023

(87) PCT Pub. No.: WO2022/069522
PCT Pub. Date: Apr. 7, 2022

(65) Prior Publication Data
US 2023/0362409 A1 Nov. 9, 2023

(30) Foreign Application Priority Data
Sep. 30, 2020 (EP) .................................... 20306134

(51) Int. Cl.
*H04N 19/59* (2014.01)
*G06V 10/54* (2022.01)
(Continued)

(52) U.S. Cl.
CPC ........... *H04N 19/597* (2014.11); *G06V 10/54* (2022.01); *G06V 10/762* (2022.01);
(Continued)

(58) Field of Classification Search
None
See application file for complete search history.

(56) References Cited

U.S. PATENT DOCUMENTS

2020/0219290 A1* 7/2020 Tourapis .............. H04N 19/597
2021/0005006 A1* 1/2021 Oh ................... H04N 21/85406
(Continued)

FOREIGN PATENT DOCUMENTS

CA          3143885 A1 * 12/2020  ........... H04N 13/139
CN     113728625 A  * 11/2021  ............... G06T 7/80
(Continued)

OTHER PUBLICATIONS

"2D Video Coding of Volumetric Video Data"—Schwarz et al., 2018 Picture Coding Symposium (PCS); Date of Conference: Jun. 24-27, 2018. (Year: 2018).*
(Continued)

*Primary Examiner* — Mainul Hasan
(74) *Attorney, Agent, or Firm* — Condo Roccia Koptiw LLP

(57) ABSTRACT

Methods, apparatus and data stream are described to encode, transmit and decode an atlas-based representation of a 3D scene based on a multiplane image (MPI) representation in which a depth component is encoded in each layer. Layers of the MPI are clustered on a transparency basis to generate texture, transparency and depth patch pictures. Patch pictures are packed in at least one atlas image. Metadata associating each patch to a layer and each layer to a depth and a depth quantization law are encoded in the data stream with the at least one atlas. At the decoding side, the MPI with a depth component is retrieved from the data stream and is used to render a viewport image from a viewpoint in the neighborhood of the center of the MPI.

19 Claims, 6 Drawing Sheets

(51) Int. Cl.
  *G06V 10/762* (2022.01)
  *H04N 13/178* (2018.01)
  *H04N 19/124* (2014.01)
  *H04N 19/597* (2014.01)
(52) U.S. Cl.
  CPC ......... *H04N 13/178* (2018.05); *H04N 19/124* (2014.11); *H04N 19/59* (2014.11)

(56) References Cited

U.S. PATENT DOCUMENTS

| | | | |
|---|---|---|---|
| 2021/0005016 A1* | 1/2021 | Oh | G06T 9/001 |
| 2021/0006833 A1* | 1/2021 | Tourapis | G06T 7/10 |
| 2021/0209807 A1* | 7/2021 | Oh | H04N 21/816 |
| 2021/0211724 A1* | 7/2021 | Kim | H04N 19/46 |
| 2021/0217200 A1* | 7/2021 | Oh | G06T 17/00 |
| 2021/0217203 A1* | 7/2021 | Kim | G06T 9/001 |
| 2021/0295567 A1* | 9/2021 | Lee | G06T 9/001 |
| 2021/0314626 A1* | 10/2021 | Kammachi Sreedhar | H04N 21/85406 |
| 2021/0320961 A1* | 10/2021 | Lee | H04L 65/612 |
| 2021/0320962 A1* | 10/2021 | Oh | G06T 9/001 |
| 2021/0398323 A1* | 12/2021 | Lee | G06T 9/001 |
| 2022/0141487 A1* | 5/2022 | Oh | G06T 9/001 375/240.08 |
| 2022/0159261 A1* | 5/2022 | Oh | H04L 65/60 |
| 2022/0172433 A1* | 6/2022 | Ricard | G06T 17/205 |
| 2022/0217314 A1* | 7/2022 | Oh | H04N 21/234 |
| 2022/0256131 A1* | 8/2022 | Oh | H04N 21/6587 |
| 2022/0377302 A1* | 11/2022 | Fleureau | H04N 13/161 |
| 2023/0050860 A1* | 2/2023 | Ilola | H04N 19/597 |
| 2023/0103016 A1* | 3/2023 | Oh | H04N 21/4348 375/240.01 |

FOREIGN PATENT DOCUMENTS

| | | | | |
|---|---|---|---|---|
| EP | 3709273 A1 | | 9/2020 | |
| WO | WO-2020141248 A1 | * | 7/2020 | G06T 9/001 |
| WO | WO-2020146547 A1 | * | 7/2020 | G06T 17/00 |
| WO | WO-2021001193 A1 | * | 1/2021 | H04N 19/46 |
| WO | WO-2021071257 A1 | * | 4/2021 | G06T 19/00 |
| WO | WO-2021122983 A1 | * | 6/2021 | G06T 15/08 |
| WO | WO-2021136876 A1 | * | 7/2021 | G06T 15/04 |
| WO | WO-2021176133 A1 | * | 9/2021 | G06T 9/001 |
| WO | WO-2021201386 A1 | * | 10/2021 | G06T 9/001 |
| WO | WO-2021204700 A1 | * | 10/2021 | G06T 3/0087 |
| WO | WO-2021206282 A1 | * | 10/2021 | G06T 9/001 |
| WO | WO-2021210860 A1 | * | 10/2021 | G02B 27/0101 |
| WO | WO 2021224056 A1 | | 11/2021 | |

OTHER PUBLICATIONS

Anonymous, "Information technology—Coded Representation of Immersive Media—Part 12: MPEG Immersive Video", International Organization for Standardization (ISO), Coding of Moving Pictures and Audio, ISO/IEC JTC 1/SC 29/WG 11, Document: N19482, Jul. 3, 2020, 82 pages.

Fleureau et al., "MIV CE1-Related—Activation of Transparency Attribute and MPI Profile in MIV", International Organization for Standardization (ISO), Coding of Moving Pictures and Audio, ISO/IEC JTC 1/SC 29/WG 4, Document: m55089, Online presentation, Oct. 2020, 14 pages.

Zhou et al., "Stereo Magnification: Learning View Synthesis using Multiplane Images", Association for Computing Machinery, ACM Transactions on Graphics, vol. 37, Issue 4, Article 65, Aug. 2018, 12 pages.

Anonymous, "ISO/IEC FDIS 23090-5, Information technology—Coded Representation of Immersive Media—Part 5: Visual Volumetric Video-based Coding (V3C) and Video-based Point Cloud Compression (V-PCC)", International Organization for Standardization (ISO), Coding of Moving Pictures and Audio, ISO/IEC JTC 1/SC 29/WG 11, Document: N19579, Jul. 4, 2020, 352 pages.

Anonymous, "High Efficiency Video Coding", ITU-T Telecommunication Standardization Sector of ITU, Series H: Audiovisual and Multimedia Systems, Infrastructure of audiovisual services—Coding of moving video, Recommendation ITU-T H.265, Feb. 2018, pp. 1-692.

Anonymous, "Information Technology—Coding of Audio-Visual Objects—Part 10: Advanced Video Coding", International Standard, ISO/IEC 14496-10, Second Edition, Oct. 1, 2004, 280 pages.

Anonymous, "Series H: Audiovisual and Multimedia Systems—infrastructure of audiovisual services—Coding of moving video: High Efficiency Video Coding", International Telecommunication Union, Recommendation ITU-T H.265, Oct. 2014, 540 pages.

Anonymous, "Terminal Equipment and Protocols for Telematic Services", Information Technology—Digital Compression and Coding of Continuous-Tone Still images—Requirements and Guidelines, International Telecommunication Union (ITU), The International Telegraph and Telephone Consultative Committee (CCITT), Document: T.81, Sep. 1992, 186 pages.

ITU_T, "Advanced video coding for generic audiovisual services", ITU-T H.264, International Telecommunication Union, ITU-T Telecommunication Standardization Sector of ITU, Series H: Audiovisual and Multimedia Systems, Infrastructure of Audiovisual Services—Coding of Moving Video, Jan. 2012, pp. 1-680.

* cited by examiner

METHOD AND APPARATUS FOR SIGNALING DEPTH OF MULTI-PLANE IMAGES-BASED VOLUMETRIC VIDEO

CROSS REFERENCE TO RELATED APPLICATIONS

This application is a U.S. National Stage Application under 35 U.S.C. § 371 of International Patent Application No. PCT/EP2021/076755, filed Sep. 29, 2021, which is incorporated herein by reference.

This application claims priority to European Application No. 20306134.6, filed Sep. 30, 2020, which is incorporated herein by reference in its entirety.

1. TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HMD).

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

A multiplane image (MPI) is a layered representation of a volumetric scene where each layer is a slice of the 3D space of the scene. Each slice is sampled according to an underlying central projection (e.g. perspective, spherical or cubical) and a sampling law which defines the interlayer spacing. A layer comprises texture information (i.e. color information) and transparency information of any 3D intersecting object of the 3D scene. Points in a slice are projected on one of the two layers delimiting the slice, for example the layer the closest to the point or the layer with a depth lower or bigger than the point. From this layered representation, it is possible to recover/synthesize a view from different viewpoints located in a limited region around the center of the underlying projection. It can be performed making use of efficient algorithms (e.g. "reversed" Painter's algorithm) which blend each layer with the proper weights (i.e. transparency) starting from the nearest to the furthest layer. Such techniques may run very much faster than other known view synthesis processes.

Different approaches, like the MIV standard (ISO/IEC CD 23090-12, Information technology—Coded Representation of Immersive Media—Part 12: MPEG Immersive Video, N19482, 4 Jul. 2020) may already be used to transport immersive video content represented in a MPI format. Only the transparency attribute, for instance, provisioned in the V3C (ISO/IEC FDIS 23090-5, Information technology—Coded Representation of Immersive Media—Part 5: Visual Volumetric Video-based Coding (V3C) and Video-based Point Cloud Compression (V-PCC), N19579, 4 Jul. 2020) on which MIV is based, has to be activated. The MPI may be conveyed in the form of two video bitstreams respectively encoding texture and transparency patch atlas images. The depth (i.e. the geometry data corresponding to a distance between projected points of the 3D scene and the projection surface or projection center) of each patch is constant (because of the principles of MPI encoding) and may be signaled, for example, in an atlas information data stream and/or in metadata of one of the data streams or in metadata of one data stream encoding the two sequences of atlases in different tracks.

A MPI-based volumetric video encoder is fed with 3D video data represented as multi-view images that may be a capture of a 3D scene by real cameras, by projection by a virtual camera or, for instance, generated from a 3D model or from a 2D image. Each view consists of a frame of texture (and potentially other attributes such as transparency) and a frame of geometry (depth map) and parameters which enable to recover the 3D scene from the view.

In particular, parameters related to depth quantization have to be included into the view parameters, and consist of the type of quantization law (for example the uniform quantization of the inverse of depth) and the minimum and maximum depth values (for instance in meters) for a given view. When the MPI-based representation is refined by adding a depth map to each layer of constant depth, there is a need for a signalization of these different parameters in metadata of a data stream representative of a MPI-based volumetric video.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate to a method comprising:
  obtaining a multiplane image representative of a 3D scene wherein layers of the multiplane image comprise a texture component, a transparency component and a depth component; the depth component being determined according to a quantization law associated with the layer;
  generating patch pictures by clustering layers of the multiplane image on a transparency basis;
  packing patch pictures in at least one atlas image;
  generating first metadata comprising, for each layer of the multiplane image, a depth value of the layer and parameters representative of the quantization law associated with the layer;
  generating second metadata associating a patch picture with a layer of the multiplane image; and
  encoding the at least one atlas image, first and second metadata in a data stream.

The present principles also relate a device implementing the method above.

The present principles also relate to a comprising:
  retrieving, from a data stream, at least one atlas image packing patch pictures comprising a texture component, a transparency component and a depth component;
  retrieving, from the data stream, first metadata associating a layer of a multiplane image representative of a 3D scene with a depth value and with parameters representative of a quantization law;

retrieving, from the data stream, second metadata associating a patch picture with a layer of the multiplane image;

building the multiplane image according to the first and the second metadata; and rendering a viewport image of the 3D scene with the multiplane image; the depth component of patch pictures being inverse quantized according to the quantization law.

The present principles also relate to a device implementing the method above.

The present principles also relate to data stream comprising:

at least one atlas image packing patch pictures having comprising a texture component, a transparency component and a depth component;

first metadata associating a layer of a multiplane image representative of a 3D scene with a depth value and with parameters representative of a quantization law; and second metadata associating a patch picture with a layer of the multiplane image.

4. BRIEF DESCRIPTION OF THE DRAWINGS

The present disclosure will be better understood, and other specific features and advantages will emerge upon reading the following description, the description making reference to the annexed drawings wherein.

5. DETAILED DESCRIPTION OF EMBODIMENTS

Figure 1:
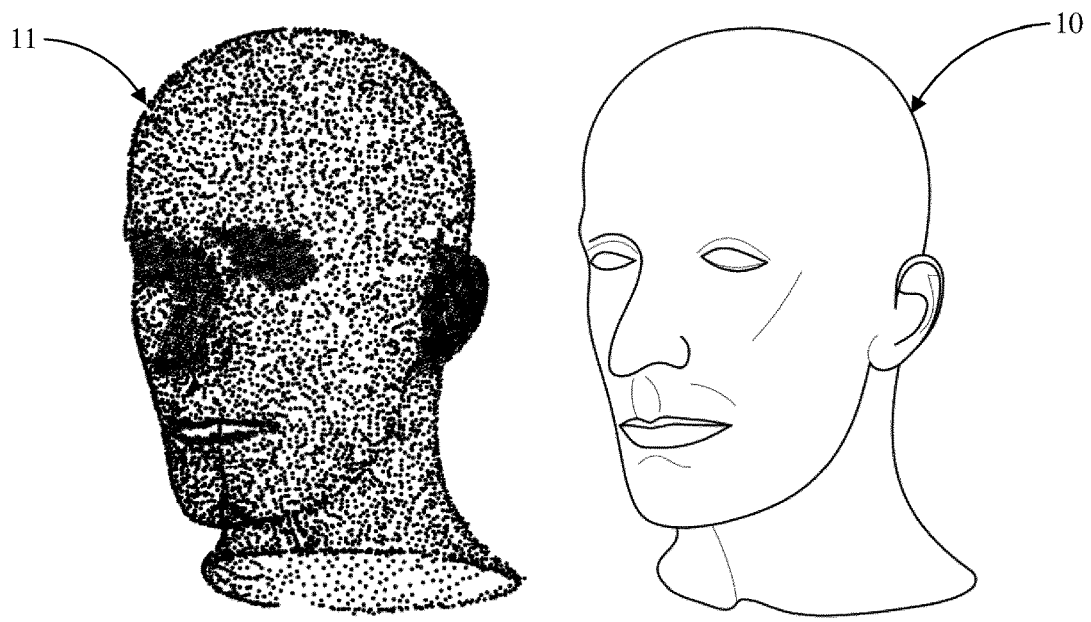
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:

from a capture of a real object shot by a rig of cameras, optionally complemented by depth active sensing device;

from a capture of a virtual/synthetic object shot by a rig of virtual cameras in a modelling tool;

from a mix of both real and virtual objects.

Figure 2:
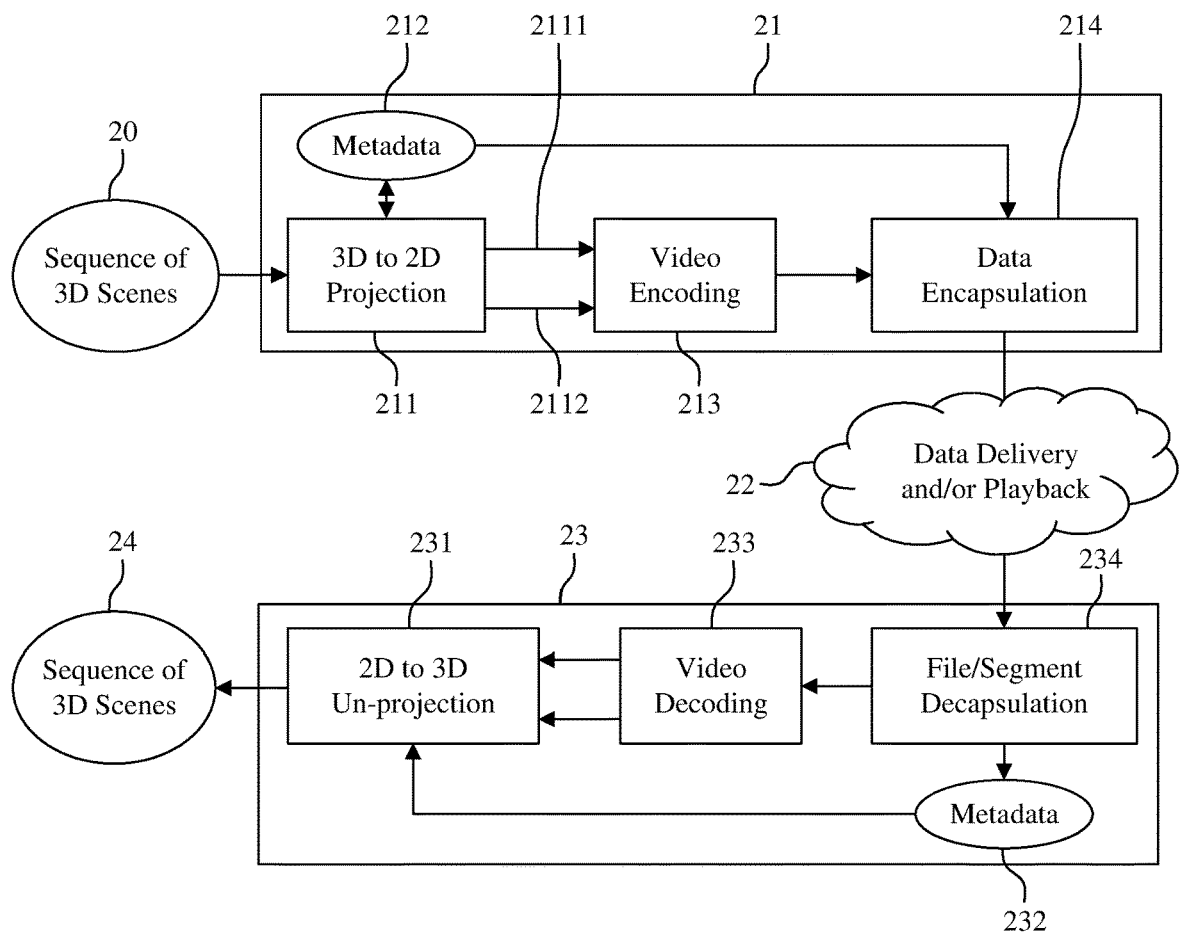
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:

JPEG, specification ISO/CEI 10918-1 UIT-T Recommendation T.81, https://www.itu.int/rec/T-REC-T.81/en;

AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-Fen);

3D-HEVC (an extension of HEVC whose specification is found at the ITU website, T recommendation, H series, h265, http://www.itu.int/rec/T-REC-H.265-201612-I/en annex G and I);

VP9 developed by Google; or

AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:

a local memory, e.g. a video memory or a RAM (or Random-Access Memory), a flash memory, a ROM (or Read Only Memory), a hard disk;

a storage interface, e.g. an interface with a mass storage, a RAM, a flash memory, a ROM, an optical disc or a magnetic support;

a communication interface, e.g. a wireline interface (for example a bus interface, a wide area network interface, a local area network interface) or a wireless interface (such as a IEEE 802.11 interface or a Bluetooth® interface); and a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

Figure 3:
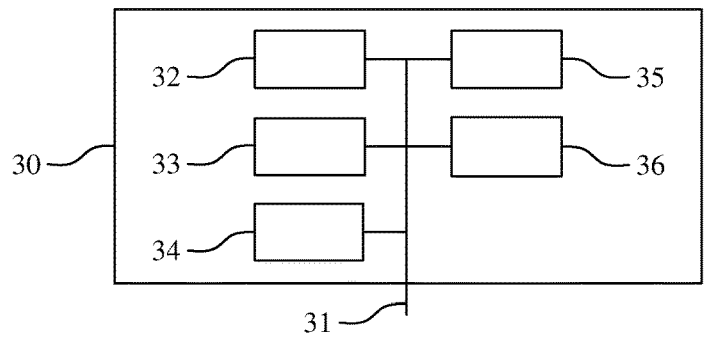
FIG. 3 shows an example architecture of a device which may be configured to implement a method described in relation with FIGS. 10 and 11, according to a non-limiting embodiment of the present principles.
Figure 10:
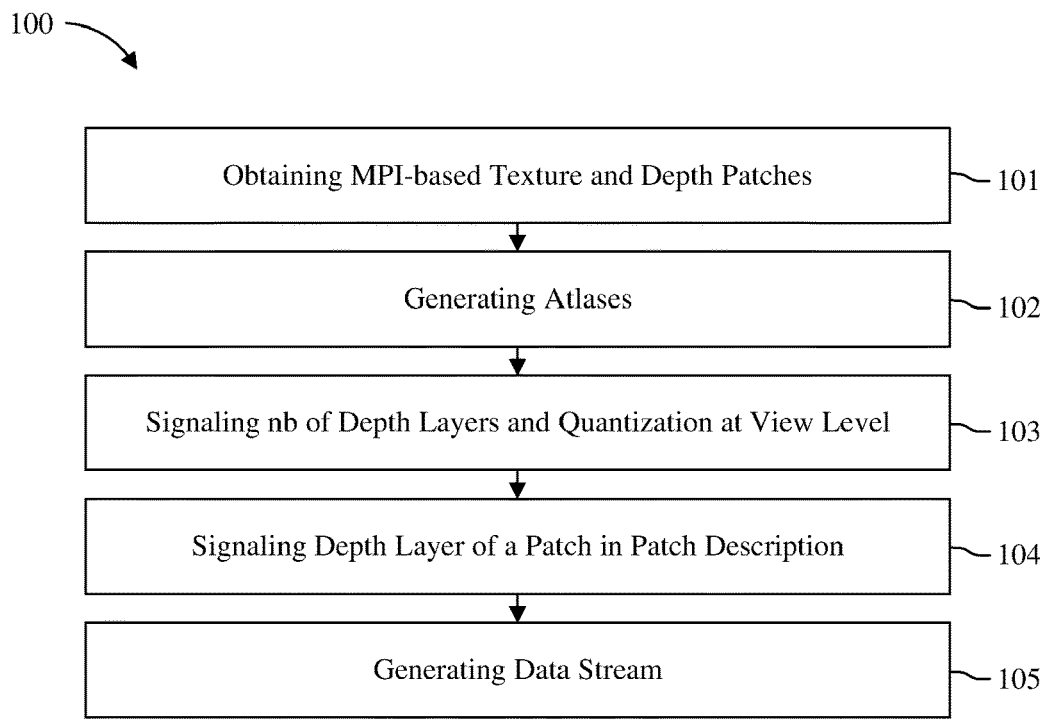
FIG. 10 illustrates a method of encoding an MPI-based 3D scene.
Figure 11:
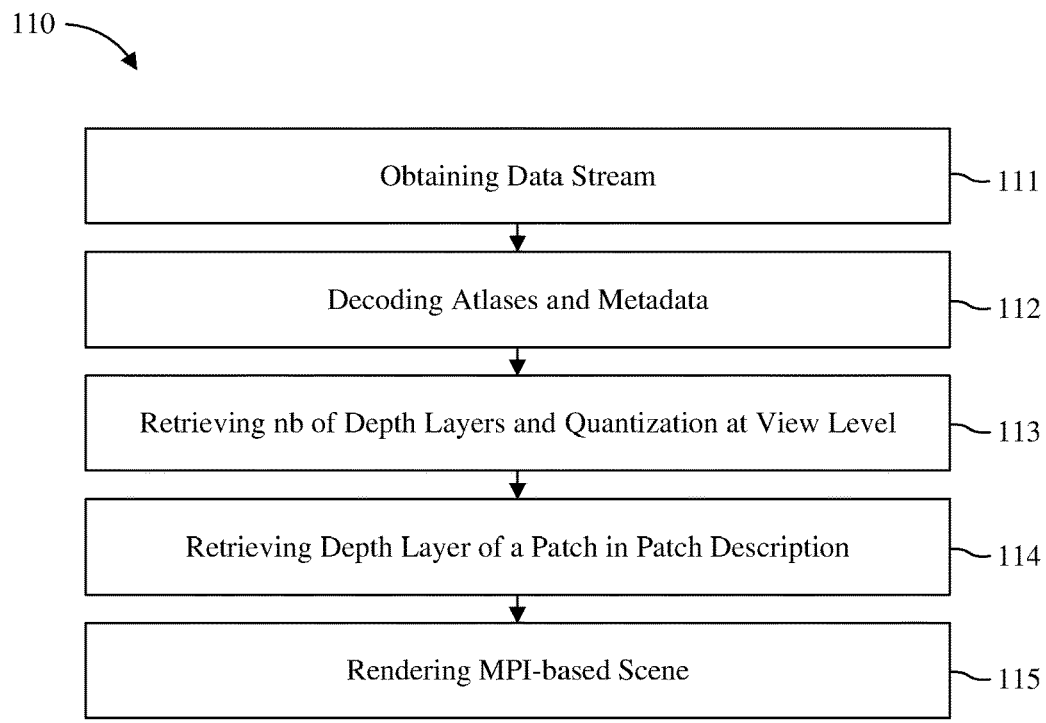
FIG. 11 illustrates a method of decoding an MPI-based 3D scene.

FIG. 3 shows an example architecture of a device 30 which may be configured to implement a method described in relation with FIGS. 10 and 11. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 10 and 11, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
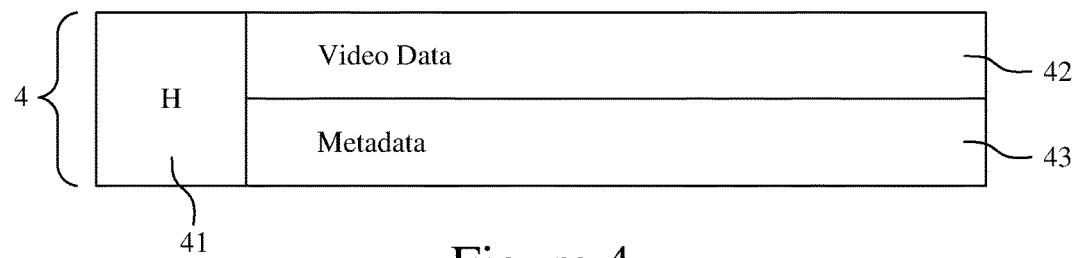
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
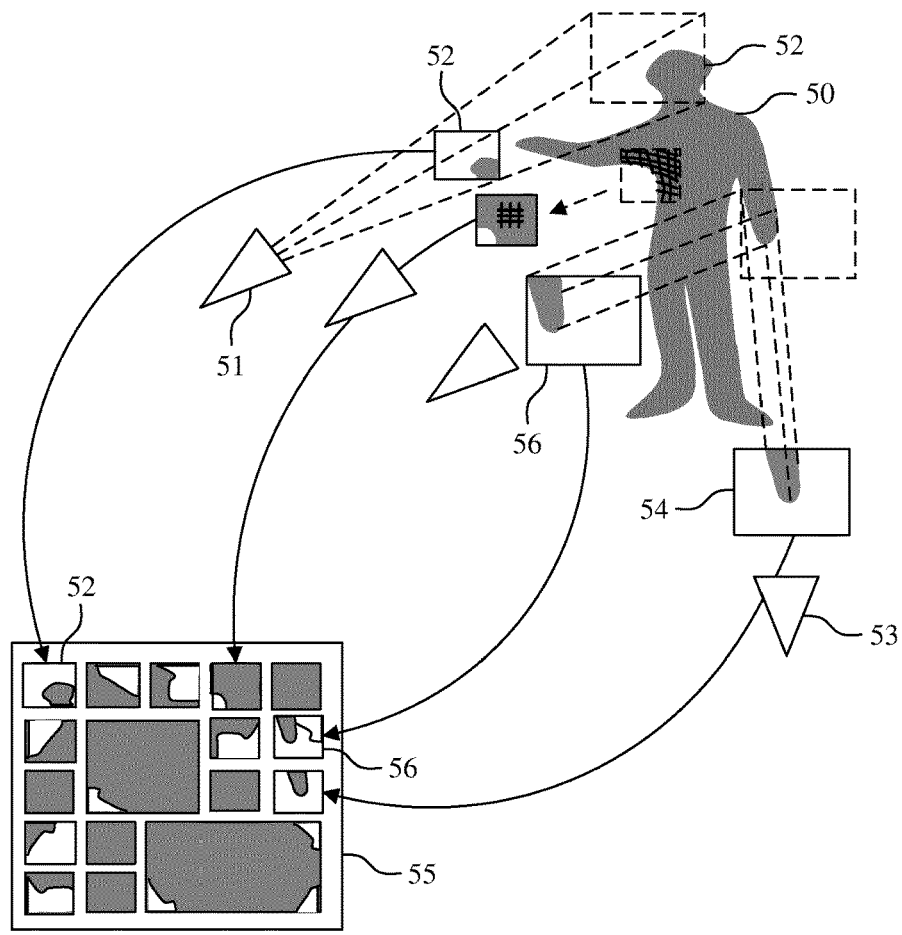
FIG. 5 illustrates a spherical projection from a central point of view, according to a non-limiting embodiment of the present principles.

FIG. 5 illustrates the patch atlas approach with an example of 4 projection centers. 3D scene 50 comprises a character. For instance, center of projection 51 is a perspective camera and camera 53 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection 51 of the points captured by a camera is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Figure 6:
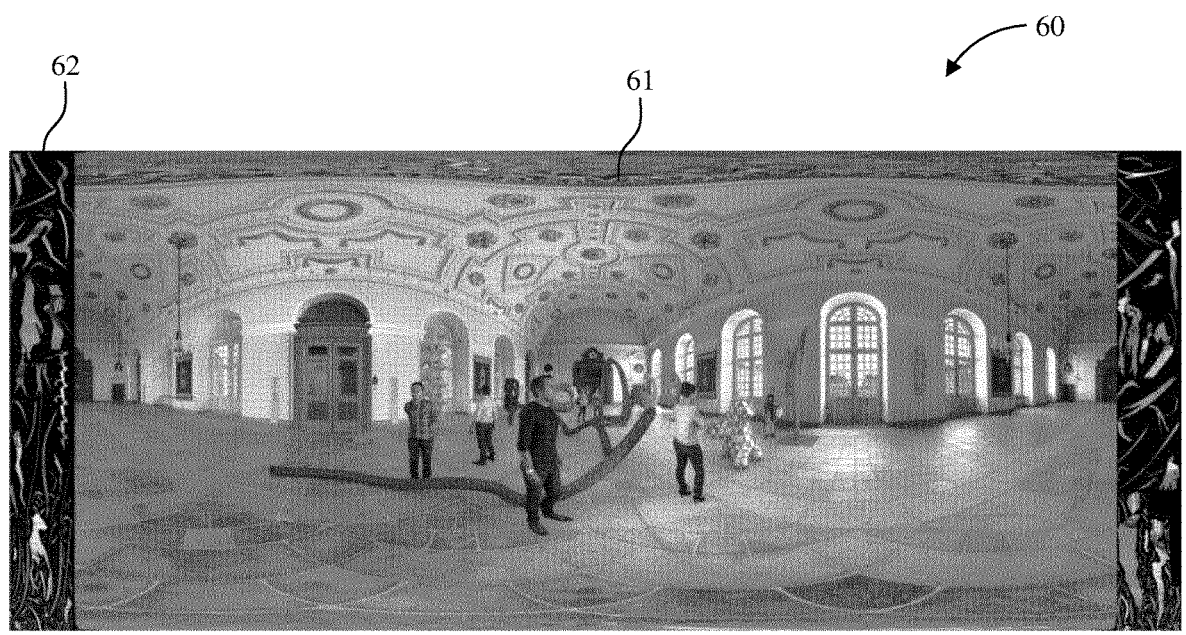
FIG. 6 shows an example of an atlas comprising the texture information of the points of a 3D scene, according to a non-limiting embodiment of the present principles.

FIG. 6 shows an example of an atlas 60 comprising the texture information (e.g. RGB data or YUV data) of the points of a 3D scene, according to a non-limiting embodiment of the present principles. As explained in relation to FIG. 5, an atlas is an image packing patches, a patch being a picture obtained by projecting a part of the points of the 3D scene.

In the example of FIG. 6, atlas 60 comprises a first part 61 comprising the texture information of the points of the 3D scene that are visible from a point of view and one or more second parts 62. The texture information of first part 61 may for example be obtained according to an equirectangular projection mapping, an equirectangular projection mapping being an example of spherical projection mapping. In the example of FIG. 6, the second parts 62 are arranged at the left and right borders of first part 61 but the second parts may be arranged differently. Second parts 62 comprise texture information of parts of the 3D scene that are complementary to the part visible from the point of view. The second parts may be obtained by removing from the 3D scene the points that are visible from the first viewpoint (the texture of which being stored in the first part) and by projecting the remaining points according to the same point of view. The latter process may be reiterated iteratively to obtain at each time the hidden parts of the 3D scene. According to a variant, the second parts may be obtained by removing from the 3D scene the points that are visible from the point of view, for example a central point of view, (the texture of which being stored in the first part) and by projecting the remaining points according to a point of view different from the first point of view, for example from one or more second point of view of a space of view centred onto the central point of view (e.g. the viewing space of a 3DoF rendering).

First part 61 may be seen as a first large texture patch (corresponding to a first part of the 3D scene) and the second parts 62 comprises smaller textures patches (corresponding to second parts of the 3D scene that are complementary to the first part). Such an atlas has the advantage to be compatible at the same time with 3DoF rendering (when rendering only first part 61) and with 3DoF+/6DoF rendering.

Figure 7:
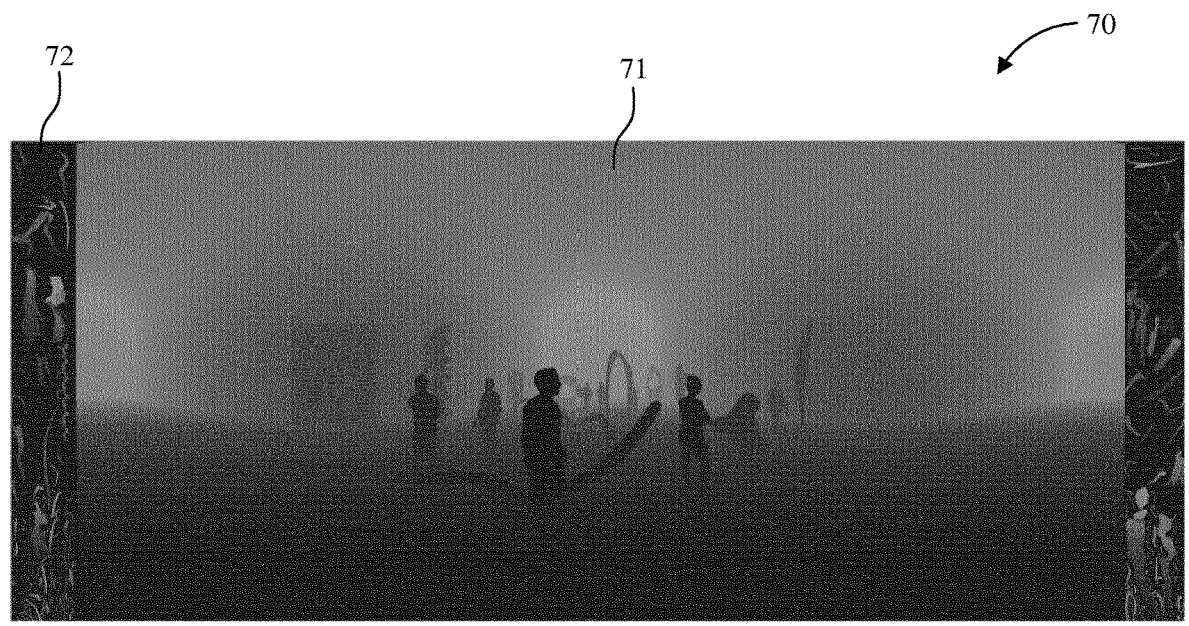
FIG. 7 shows an example of an atlas comprising the depth information of the points of the 3D scene of FIG. 6, according to a non-limiting embodiment of the present principles.

FIG. 7 shows an example of an atlas 70 comprising the depth information of the points of the 3D scene of FIG. 6, according to a non-limiting embodiment of the present principles. Atlas 70 may be seen as the depth image corresponding to texture image 60 of FIG. 6.

Atlas 70 comprises a first part 71 comprising the depth information of the points of the 3D scene that are visible from the central point of view and one or more second parts 72. Atlas 70 may be obtained in a same way as atlas 60 but contains the depth information associated with the points of the 3D scene instead of the texture information.

For 3DoF rendering of the 3D scene, only one point of view, typically the central point of view, is considered. The user may rotate his head in three degrees of freedom around the first point of view to watch various parts of the 3D scene, but the user cannot move this unique point of view. Points of the scene to be encoded are points which are visible from this unique point of view, and only the texture information is needed to be encoded/decoded for the 3DoF rendering. There is no need to encode points of the scene that are not visible from this unique point of view for a 3DoF rendering as the user cannot access to them.

With regard to 6DoF rendering, the user may move the viewpoint everywhere in the scene. In this case, it is required to encode every point (depth and texture) of the scene in the bitstream as every point is potentially accessible by a user who can move his/her point of view. At the encoding stage, there is no means to know, a priori, from which point of view the user will observe the 3D scene.

With regard to 3DoF+ rendering, the user may move the point of view within a limited space around a central point of view. This enables to experience parallax. Data representative of the part of the scene visible from any point of the space of view is to be encoded into the stream, including the data representative of the 3D scene visible according to the central point of view (i.e. first parts 61 and 71). The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

Figure 8:
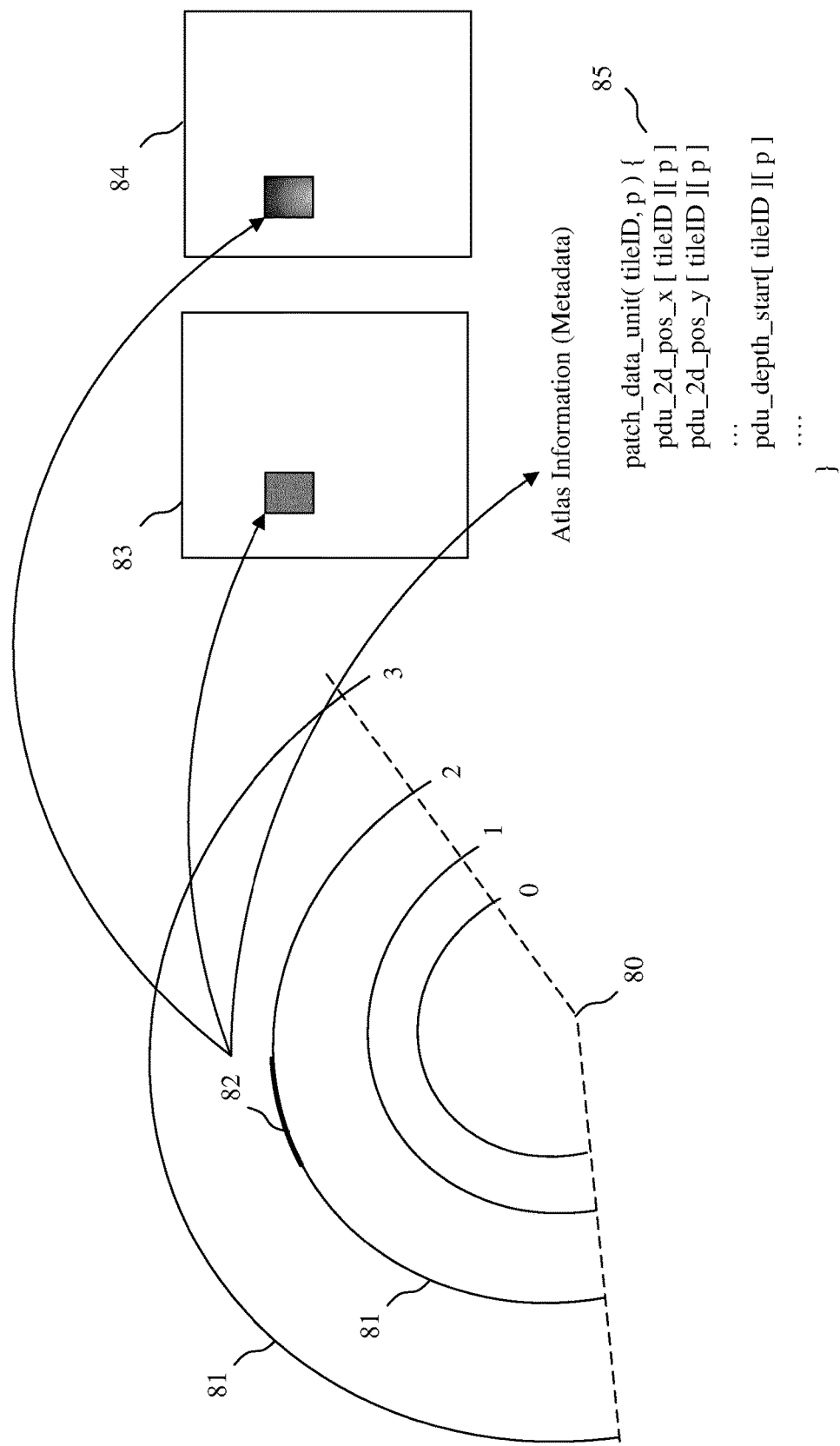
FIG. 8 illustrates the construction of an MPI-based atlas from a MPI, according to a non-limiting embodiment of the present principles.

FIG. 8 illustrates the construction of an MPI-based atlas from an MPI. A multiplane image (MPI) is a layered representation of a volumetric scene (also called 3D scene) where each layer 81 is a slice of the 3D space of the scene. Each slice is sampled according to an underlying central projection 80 (e.g. perspective, spherical) and a sampling law which defines the interlayer spacing. A layer comprises texture information (i.e. color information) and transparency information of any 3D intersecting object of the 3D scene. Points between two layers are projected on one of the two layers 81, for example the layer closest to the point or the layer with a depth lower or greater than the point. From this layered representation, it is possible to synthesize a view for any viewpoint located in a limited region around the center of the underlying projection 80. It can be performed making use of efficient algorithms (e.g. "reversed" Painter's algorithm) which blend each layer with the proper weights (i.e. transparency) starting from the nearest to the furthest from the center of projection 80. The MPI-based atlas may be conveyed by two bitstreams respectively encoding texture and transparency patch atlas images. Pixels of a layer 81 are clustered based on the transparency information. Parts of a layer with a transparency higher than a given threshold (for example 80% or 99% transparent or totally transparent) are ignored. Pixels with a lower level of transparency are clustered and form patches. Patches are packed in two atlas images 83 and 84, one for texture information 83 and one for transparency information 84. In a variant, a single atlas image conveying both information data may be generated. The depth information, that is the geometry data corresponding to a distance between projected points of the 3D scene and the projection surface or projection center, of each patch is constant (because of the principles of MPI encoding). Indeed, points of the 3D scene are already projected on layers that are at a constant distant from the center of projection. In such an embodiment, the depth information is signaled, for example, in metadata 85 associated with each patch. However, having a constant depth for a patch may lead to a too coarse quantization of the geometry and to visual artefacts when rendering the 3D scene from another viewpoint than the center of projection.

Figure 9:
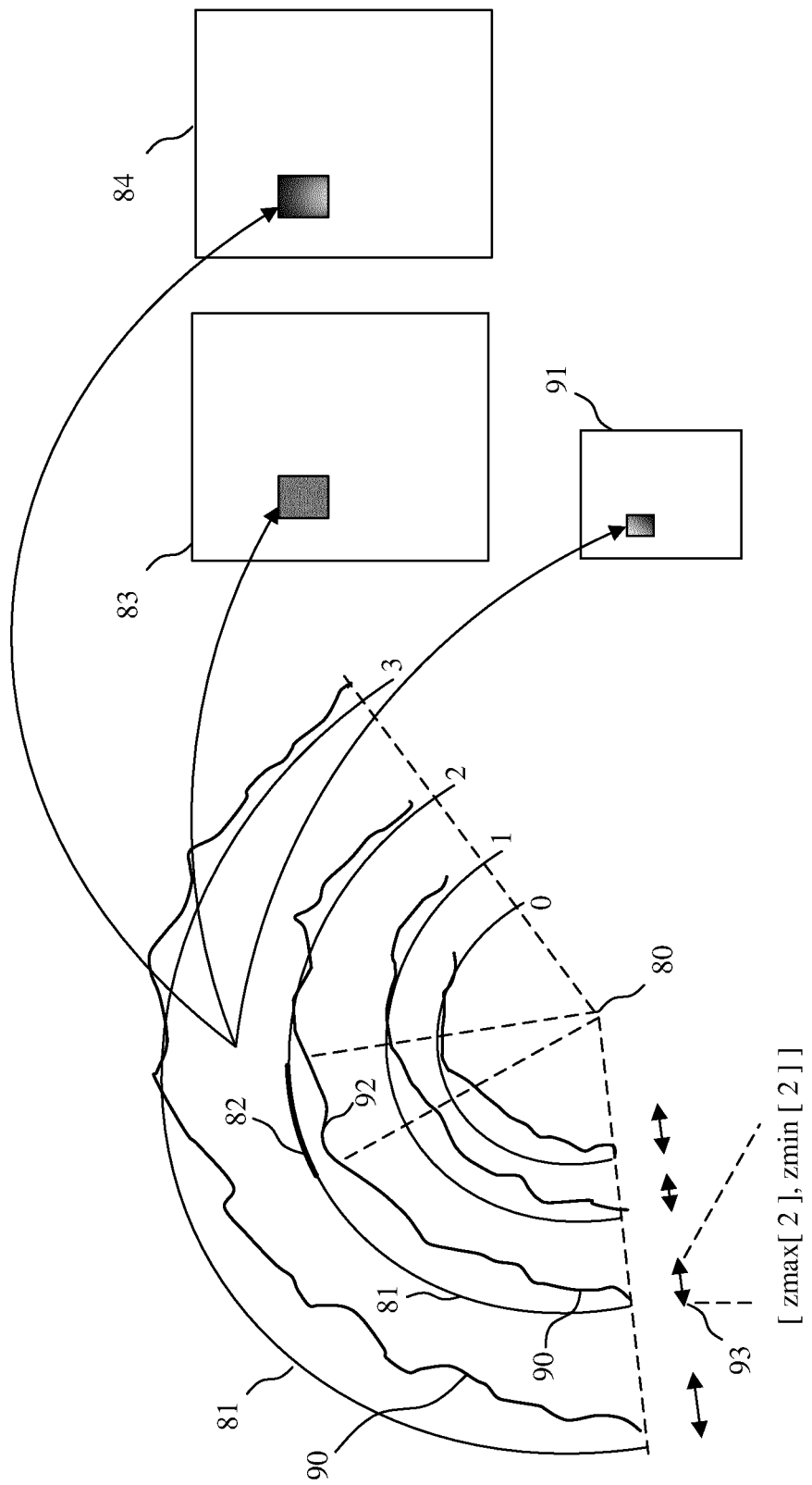
FIG. 9 illustrates the construction of an MPI-based atlas from a MPI with a depth component, according to a non-limiting embodiment of the present principles.

FIG. 9 illustrates the construction of an MPI-based atlas from a MPI with a depth component according to the present principles. A depth map 90 is added on top of each layer, to overcome a too coarse quantization of geometry. When points of a slice of the 3D scene are projected onto a layer, the distance between the projected points and the layer is stored in depth map 90. Patches are determined by clustering pixels of the layers based on the transparency level, as described in relation to FIG. 8. When packing color information of patch 82 in texture atlas 83, transparency information of patch 82 in transparency atlas 84, depth information 92 of patch 82 is packed in depth atlas 91. This enhanced depth representation enables the rendering of synthesized views with a higher resolution (i.e. lower blur) and less visual artifacts (i.e. missing points). According to the present principles, a depth atlas 91 is added to the texture atlas 83 and transparency atlas 84 as illustrated in relation to FIG. 8. Depth atlas 91 may, for instance, be transported in a geometry video channel. In a variant, depth atlas 91 is downscaled to decrease the size of the data to transmit. Metadata to signal characteristics of this MPI representation are necessary.

In one embodiment of the present principles, the MPI volume is split into non-empty local partitions. A partition encompasses several consecutive layers of the MPI. Zmin (i.e. minimal depth) and Zmax (i.e. maximal depth) respectively are the depth values of the closest and the farthest layers of the partition. The partition may be represented with MIV texture, transparency and depth patches. The local depth map is relative to Zmin, and quantized in the interval 93 [Zmin, Zmax] of the partition. In this embodiment, Zmin and Zmax values are added in metadata associated with the patch, that is at the patch level in a patch data unit structure.

An MPI-based volumetric video encoder is fed with 3D video data represented as a plurality of views, which may be a 3D scene captured by real cameras or obtained by projection of a 3D model on the views. Each view comprises a texture frame, a geometry frame and view parameters (i.e. metadata) that enable to recover the 3D scene from the view. Pixels of the texture frame encode a color value and may encode other attributes like transparency or reflectance.

According to the present principles, parameters related to depth quantization are included into the view parameters and comprise the type of quantization law (for example the uniform quantization of the inverse of depth) and the minimum and maximum depth values (for instance in meters).

The MPI with enhanced depth representation, illustrated in FIG. 9, may be encoded as a central patch with associated view parameters, plus a collection of texture, transparency and depth patches, packed into three atlases. According to the present principles, metadata related to depth quantization are added to the view parameters. The (Zmin, Zmax) depth range used for quantizing the depth map of each layer is signaled to perform the inverse quantization at decoder side. In an embodiment, the depth range is represented by the distance between two consecutive layers. The depth of each layer is also signaled. In this embodiment, the syntax provides a pair of syntax elements per view to signal the depth quantization parameters.

However, an MPI-based atlas may comprise patches from several views. In another embodiment, to overcome this issue, as many views as layers are instantiated: a MPI with NL depth layers requires NL views, all with same extrinsic camera parameters (camera position and orientation) and same intrinsic camera parameters (projection model). This embodiment requires more metadata than the first embodiment as view parameters common to all layers would be duplicated, in particular the extrinsic camera parameters (position and orientation of the view); only the intrinsic camera parameters (projection model) can be said to all be equal to those of view with index 0 in MIV.

In another embodiment, local depth patches encompass several consecutive layers, and requires the signaling of (Zmin, Zmax) depth range at the patch level, for example, by adding two syntax elements to the MIV extension of the patch data unit syntax structure. This embodiment is more demanding in terms of metadata bitrate, the number of patches in the atlas being of a larger order of magnitude than the number of layers in a MPI view, and the view parameters being infrequently updated while the patch list is regularly refreshed, typically per intra-period (e.g., every 32 frames).

According to the present principles, the number of depth layers and depth quantization parameters are signaled in a syntax structure for each layer embedded in a view parameters syntax structure, and, the index of the depth layer that a patch belongs to is signaled in a patch description syntax structure, in association with the signalization of the view index. The following syntax and semantics are proposed to support the transport of immersive video in MPI format.

| miv_view_params_list( ) { | Descriptor |
|---|---|
|   mvp_num_views_minus1 | u(16) |
|   for( v = 0; v <= num_views_minus1; v++ ) | |
|     mvp_num_layers_minus1[ v ] | u(8) |
|   mvp_view_enabled_present_flag | u(1) |
|   if( mvp_view_enabled_present_flag ) { | |
|     for( a = 0; a <= vps_atlas_count_minus1; a++ ) | |
|       for( v = 0; v <= mvp_num_views_minus1; v++ ){ | |
|         mvp_view_enabled_in_atlas_flag[ a ][ v ] | u(1) |
|         if( mvp_view_enabled_in_atlas_flag[ a ][ v ] ) | |
|         mvp_view_complete_in_atlas_flag[ a ][ v ] | u(1) |
|       } | |
|   } | |
|   mvp_explicit_view_id_flag | u(1) |
|   if( mvp_explicit_view_id_flag ) | |
|     for( v = 0; v <= mvp_num_views_minus1; v++ ) | |
|       mvp_view_id[ v ] | u(16) |
|   for( v = 0; v <= num_views_minus1; v++ ) | |
|     camera _extrinsics( v ) | |
|   mvp_intrinsic_params_equal_flag | u(1) |
|   for( v = 0; v <= mvp_intrinsic_params_equal_flag ? 0 : mvp_num_vie ws_minus1; v++ ) | |

| miv_view_params_list( ) { | Descriptor |
|---|---|
|     camera_intrinsics( v, 0 ) | |
|   mvp_depth_quantization_params_equal_flag | u(1) |
|   for( v = 0; v <= mvp_depth_quantization_equal_flag ? 0 : mvp_num_views minus1; v++ ) | |
|     depth_quantization( v ) | |
|   mvp_pruning_graph_params_present_flag | u(1) |
|   if ( mvp_pruning_graph_params_present_flag ) | |
|     for( v = 0; v <= mvp_num_views_minus1; v++ ) | |
|       pruning_parents( v ) | |
| } | |

The semantics for mvp_num_layers_minus1[v] element would be the following:

mvp_num_layers_minus1[v] plus 1 indicates the number of depth layers of the view with index v. When not present the value of mvp_num_layers_minus1[v] is inferred to be 0.

The semantics of other elements is to be linked with similar elements standardized in MIV miv_viewparams_list( ) data structure.

According to the present principles, specific depth quantization parameters are specified per each depth layer according to the following syntax:

| depth_quantization( v ) { | Descriptor |
|---|---|
|   dq_quantization_law[ v ] | u(8) |
|   for( k = 0; k <= mvp_num_layers_minus1[ v ]; k++ ) { | |
|     dq_low[ v ][ k ] | fl(32) |
|     dq-high[ v ][ k ] | fl(32) |
|   } | |
|   if( vme_embedded_occupancy_flag ) | |
|     dq_depth_occ_threshold_default[ v ] | ue(v) |
| } | |

The depth map associated with a depth layer with index k in a MPI representation has a limited excursion (i.e. the size of the zone around the central point view from which the parallax effect can be experienced without missing data), as it typically does not span the depth range of the entire 3D scene but only the depth range between two consecutive depth layers as illustrated in FIG. 9. According to the present principles, a default depth quantization law may be a uniform quantization of the inverse of depth values, which finely quantizes the depth of the object close to the viewport as regards with remote background. For quantifying depth maps of limited excursion, a uniform quantization of the depth values (instead of the inverse of depth values) may be preferable. For that reason, a second quantization law is set in the depth_quantization(v) syntax structure and make the semantics of the minimum and maximum values of the signal before quantization generic. The semantics for this syntax is the following:

dq_quantization_law[v] indicates the type of depth quantization method of the view with index v. dq_quantization_law[v] equal to 0 specifies a uniform quantization of the inverse of depth values. dq_quantization_law[v] equal to 1 specifies a uniform quantization of depth values. Values of dq_quantization_law[v] greater than 1 are reserved for future use by ISO/IEC.

dq_low[v][k] and dq_high[v][k] specify the minimum and maximum values, respectively, of the preprocessed signal before uniform quantization, for the layer with index k in the view with index v.

If dq_quantization_law[v] is equal to 0, dq_low[v][k] and dq_high[v] are expressed in meters$^{-1}$ (i.e. 1/z where z is expressed in meters). If dq_quantization_law[v] is equal to 1, dq_low[v][k] and dq_high[v] are expressed in meters.

The syntax proposed according to the present principles enables to convey an immersive video content represented in a MPI format with enhanced depth, which proved to enable fast rendering of higher quality at the view synthesis side. This syntax does not duplicate metadata.

FIG. 10 illustrates a method 100 of encoding a MPI-based 3D scene. At a step 101, a 3D scene is obtained, represented as a multiplane image (MPI). Layers of the MPI comprise texture, transparency and depth information. This information maybe encoded in different pixel maps. Patch pictures are extracted from the different layers of the MPI representation. Pixels of layers are clustered on a transparency basis. A patch is a part of a layer of the MPI and comprises texture, transparency and depth information. A patch may be coded as three pictures, one for the texture, one for the transparency and one for the depth. In variants, a same picture may carry two or three of these types of data. At a step 102, these patches are packed in separate atlases according to their nature (i.e. texture or color, transparency, depth, . . . ). In variants, patches are encoded in one or two atlases. At a step 103, metadata are generated to signal the elements of the representation. According to the present principles, the number of depth layers of the MPI representation and parameters representative of the depth quantization law are encoded at a view level in the metadata. At a step 104, metadata are generated to signal the depth layer that a patch belongs to in a syntax structure representative of a description of the patch. At a step 105, generated atlases and generated metadata are encoded in a data stream.

FIG. 11 illustrates a method 110 of decoding an MPI-based 3D scene. At a step 111, a data stream is obtained according to the present principles. At a step 112, the data stream is decoded to retrieve at least one atlas image and associated metadata. In an embodiment, only one atlas is retrieved, pixels of the atlas embedding values of different natures comprising color, transparency and depth components. In another embodiment, several atlases are retrieved, pixels of one atlas comprising at least one of color, transparency and depth components, each of the three components being encoded in at least one atlas. At a step 113, metadata are analyzed to retrieve a number of depth layers and parameters representative of a depth quantization law at a view level in the metadata, according to the present principles. At a step 114, the depth layer that a given patch is belonging to is retrieved from a syntax structure representative of a description of the patch in the metadata, according to the present principles. A depth layer is built at a depth indicated in the metadata. Patches (texture, transparency and depth patches), as parts of a layer, are placed on the layer. Then, according to the present principles, points of the 3D scene may be inverse projected from pixels of the layer as a function of the depth value of the pixels and according to the associated quantization law. At a step 115, a viewport image is rendered from a viewpoint in a neighborhood of the center of projection of the retrieved MPI-based 3D scene.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
    obtaining a multiplane image representative of a three-dimensional (3D) scene, wherein layers of the multiplane image have a constant depth value and comprise a texture component, a transparency component, and a depth component, the depth component being determined according to a quantization law relative to the constant depth value of the layer;
    generating patch pictures by clustering layers of the multiplane image on a transparency basis;
    packing the patch pictures in at least one atlas image;
    generating first metadata comprising, for each layer of the multiplane image, the constant depth value of the layer and one or more parameters representative of the quantization law relative to the constant depth value of the layer;
    generating second metadata associating a patch picture with a layer of the multiplane image; and
    encoding the at least one atlas image, the first metadata, and the second metadata in a data stream.

2. The method of claim 1, wherein the texture component of the patch pictures is stored in a texture atlas image, wherein the transparency component of the patch pictures is stored in a transparency atlas image, and wherein the depth component of the patch pictures is stored in a depth atlas image.

3. The method of claim 2, wherein the depth atlas image is downscaled.

4. The method of claim 1, wherein the patch pictures comprise a texture component, a transparency component, and a depth component.

5. A device comprising circuitry, comprising a processor and a memory, configured for:
    obtaining a multiplane image representative of a three-dimensional (3D) scene, wherein layers of the multiplane image have a constant depth value and comprise a texture component, a transparency component, and a depth component, the depth component being determined according to a quantization law relative to the constant depth value of the layer;
    generating patch pictures by clustering layers of the multiplane image on a transparency basis;
    packing the patch pictures in at least one atlas image;
    generating first metadata comprising, for each layer of the multiplane image, the constant depth value of the layer and one or more parameters representative of the quantization law relative to the constant depth value of the layer;
    generating second metadata associating a patch picture with a layer of the multiplane image; and
    encoding the at least one atlas image, the first metadata, and the second metadata in a data stream.

6. The device of claim 5, wherein the texture component of the patch pictures is stored in a texture atlas image, wherein the transparency component of the patch pictures is stored in a transparency atlas image, and wherein the depth component of the patch pictures is stored in a depth atlas image.

7. The device of claim 6, wherein the depth atlas image is downscaled.

8. The device of claim 5, wherein the patch pictures comprise a texture component, a transparency component, and a depth component.

9. A method comprising:
retrieving, from a data stream, at least one atlas image packing patch pictures comprising a texture component, a transparency component, and a depth component;
retrieving, from the data stream, first metadata comprising, for each layer of a multiplane image representative of a three-dimensional (3D) scene, a constant depth value and one or more parameters representative of a quantization law relative to the constant depth value of the layer;
retrieving, from the data stream, second metadata associating each patch picture with a layer of the multiplane image;
building the multiplane image according to the first metadata and the second metadata; and
rendering a viewport image of the 3D scene with the multiplane image, wherein the depth component of each patch picture is inverse quantized according to the quantization law relative to the constant depth value of the layer associated with the patch picture in the second metadata.

10. The method of claim 9, wherein the texture component of the patch pictures is retrieved from a texture atlas image, wherein the transparency component of the patch pictures is retrieved from a transparency atlas image, and wherein the depth component of the patch pictures is retrieved from a depth atlas image.

11. The method of claim 10, wherein the depth atlas image is upscaled.

12. A device comprising circuitry, comprising a processor and a memory, configured for:
retrieving, from a data stream, at least one atlas image packing patch pictures comprising a texture component, a transparency component, and a depth component;
retrieving, from the data stream, first metadata comprising, for each layer of a multiplane image representative of a three-dimensional (3D) scene, a constant depth value and one or more parameters representative of a quantization law relative to the constant depth value of the layer;
retrieving, from the data stream, second metadata associating each patch picture with a layer of the multiplane image;
building the multiplane image according to the first metadata and the second metadata; and
rendering a viewport image of the 3D scene with the multiplane image, wherein the depth component of each patch picture is inverse quantized according to the quantization law relative to the constant depth value of the layer associated with the patch picture in the second metadata.

13. The device of claim 12, wherein the texture component of the patch pictures is retrieved from a texture atlas image, wherein the transparency component of the patch pictures is retrieved from a transparency atlas image, and wherein the depth component of the patch pictures is retrieved from a depth atlas image.

14. The device of claim 13, wherein the depth atlas image is upscaled.

15. A non-transitory computer readable medium having stored thereon instructions for causing one or more processors to perform a method comprising:
obtaining a multiplane image representative of a three-dimensional (3D) scene wherein layers of the multiplane image have a constant depth value and comprise a texture component, a transparency component, and a depth component, the depth component being determined according to a quantization law relative to the constant depth value of the layer;
generating patch pictures by clustering layers of the multiplane image on a transparency basis;
packing the patch pictures in at least one atlas image;
generating first metadata comprising, for each layer of the multiplane image, the constant depth value of the layer and one or more parameters representative of the quantization law relative to the constant depth value of the layer;
generating second metadata associating a patch picture with a layer of the multiplane image; and
encoding the at least one atlas image, the first metadata, and the second metadata in a data stream.

16. The non-transitory computer readable medium of claim 15, wherein the texture component of the patch pictures is stored in a texture atlas image, wherein the transparency component of the patch pictures is stored in a transparency atlas image, and wherein the depth component of the patch pictures is stored in a depth atlas image.

17. The non-transitory computer readable medium of claim 16, wherein a size of the depth atlas image is smaller than a size of the other atlases.

18. The non-transitory computer readable medium of claim 16, wherein the patch pictures comprise a texture component, a transparency component, and a depth component.

19. The non-transitory computer readable medium of claim 16, wherein the depth atlas image is downscaled.

* * * * *